(12) United States Patent
Dey et al.

(10) Patent No.: US 10,229,429 B2
(45) Date of Patent: Mar. 12, 2019

(54) CROSS-DEVICE AND CROSS-CHANNEL ADVERTISING AND REMARKETING

(71) Applicant: International Business Machines Corporation, Armonk, NY (US)

(72) Inventors: Kuntal Dey, New Delhi (IN); Seema Nagar, Bangalore (IN); Swati Rallapalli, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 14/751,555

(22) Filed: Jun. 26, 2015

(65) Prior Publication Data

US 2016/0379245 A1 Dec. 29, 2016

(51) Int. Cl.
*G06Q 30/02* (2012.01)

(52) U.S. Cl.
CPC ..... *G06Q 30/0246* (2013.01); *G06Q 30/0255* (2013.01); *G06Q 30/0261* (2013.01); *G06Q 30/0267* (2013.01); *G06Q 30/0277* (2013.01)

(58) Field of Classification Search
CPC ....................................... G06Q 30/02–30/0277
See application file for complete search history.

(56) References Cited

U.S. PATENT DOCUMENTS

| | | | |
|---|---|---|---|
| 7,715,533 B2 | 5/2010 | Pradhan et al. | |
| 8,768,769 B2 | 7/2014 | Foladare et al. | |
| 8,898,074 B2 | 11/2014 | Doughty et al. | |
| 2010/0280876 A1* | 11/2010 | Bowra | G06Q 30/0242 705/14.41 |
| 2012/0290938 A1* | 11/2012 | Subbarao | H04L 67/22 715/738 |
| 2013/0018719 A1* | 1/2013 | Abraham | G06Q 30/0242 705/14.41 |
| 2013/0169560 A1* | 7/2013 | Cederlund | G06F 3/013 345/173 |

(Continued)

OTHER PUBLICATIONS

Ronald P. Hill and Michael B. Mazis, "Measuring Emotional Responses to Advertising", in NA—Advances in Consumer Research vol. 13, eds. Richard J. Lutz, Provo, UT : Association for Consumer Research, pp. 164-169. Retrieved from Internet.<URL: http://acrwebsite.org/volumes/6485/volumes/v13/NA-13> (Year: 1986).*

*Primary Examiner* — Michael W Schmucker
*Assistant Examiner* — Bion A Shelden
(74) *Attorney, Agent, or Firm* — Cahn & Samuels, LLP

(57) ABSTRACT

An embodiment of the invention identifies a positive reaction to an advertisement and sends the advertisement to a mobile and/or wearable electronic device of a user. The advertisement can be sent to the mobile and/or wearable electronic device of the user only when the user is within a first threshold distance to a store of the advertiser, the user is within a second threshold distance to a store that is within a third threshold degree of similarity to the advertisement, the user is within the second threshold distance to a store that is within the third threshold degree of similarity to the advertiser, the user is browsing a website of the advertiser, the user is browsing a website that is within a fourth threshold degree of similarity to the advertisement, and/or the user is browsing a website that is within the fourth threshold degree of similarity to the advertiser.

15 Claims, 9 Drawing Sheets

(56) References Cited

U.S. PATENT DOCUMENTS

| | | | |
|---|---|---|---|
| 2014/0049462 A1* | 2/2014 | Weinberger | G06F 3/013 345/156 |
| 2014/0067498 A1 | 3/2014 | De et al. | |
| 2014/0317646 A1* | 10/2014 | Garza | H04N 21/44218 725/12 |
| 2014/0351405 A1* | 11/2014 | Brown | H04L 45/14 709/223 |
| 2014/0358612 A1* | 12/2014 | Sri | G06Q 30/016 705/7.15 |
| 2015/0020083 A1* | 1/2015 | Ben-Itzhak | G06F 9/543 719/320 |
| 2016/0063569 A1* | 3/2016 | Williams | G06Q 30/0269 705/14.64 |
| 2016/0092930 A1* | 3/2016 | Chang | G06Q 30/0269 705/14.66 |

\* cited by examiner

CROSS-DEVICE AND CROSS-CHANNEL ADVERTISING AND REMARKETING

BACKGROUND

The present invention relates to systems, methods, and computer program products for physical-to-physical, physical-to-online, online-to-physical, and cross-device and cross-channel advertising and remarketing.

In today's marketplace, advertisements can be a composition of text, audio, and/or video. Advertisements can appear on physical media, such as newspapers and magazines, or on online media. Furthermore, advertisements can appear on web-enabled wearable devices (e.g., Google Glass (also referred to herein as "web-enabled glasses" or "glasses"), Apple Watch, wearable rings, FitBit, etc.) and span over a time period (defined in terms of seconds, minutes, etc.). Any subsection of advertisements, whether comprised of text, audio, and/or video, can be defined as an advertisement snippet. Advertisement snippets can appear over a smaller or an equal span of time as the original ad.

SUMMARY OF THE INVENTION

An embodiment of the invention provides a method for advertising, wherein a processor identifies a positive reaction of a user to at least a portion of an advertisement. The positive reaction can include viewing the advertisement for at least a first threshold amount of time, activating a hyperlink on the advertisement, making a purchase a second threshold amount of time after the at least a portion of the advertisement was presented to the user, browsing a website of an advertiser of the advertisement for at least a third threshold amount of time, performing a web search for an item within a first threshold degree of similarity to the advertisement, and/or performing a web search for an entity within a second threshold degree of similarity to the advertiser.

The processor can send at least a portion of the advertisement and/or an instruction to a mobile device of the user and/or a wearable electronic device of the user, wherein the instruction includes an instruction to present the at least a portion of the advertisement to the user. The processor can only send the at least a portion of the advertisement and/or the instruction to the mobile device of the user and/or the wearable electronic device of the user when the user is within a first threshold distance to a store of the advertiser, the user is within a second threshold distance to a store that is within a third threshold degree of similarity to the advertisement, the user is within the second threshold distance to a store that is within the third threshold degree of similarity to the advertiser, the user is browsing a website of the advertiser, the user is browsing a website that is within a fourth threshold degree of similarity to the advertisement, and/or the user is browsing a website that is within the fourth threshold degree of similarity to the advertiser.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Figure 1:
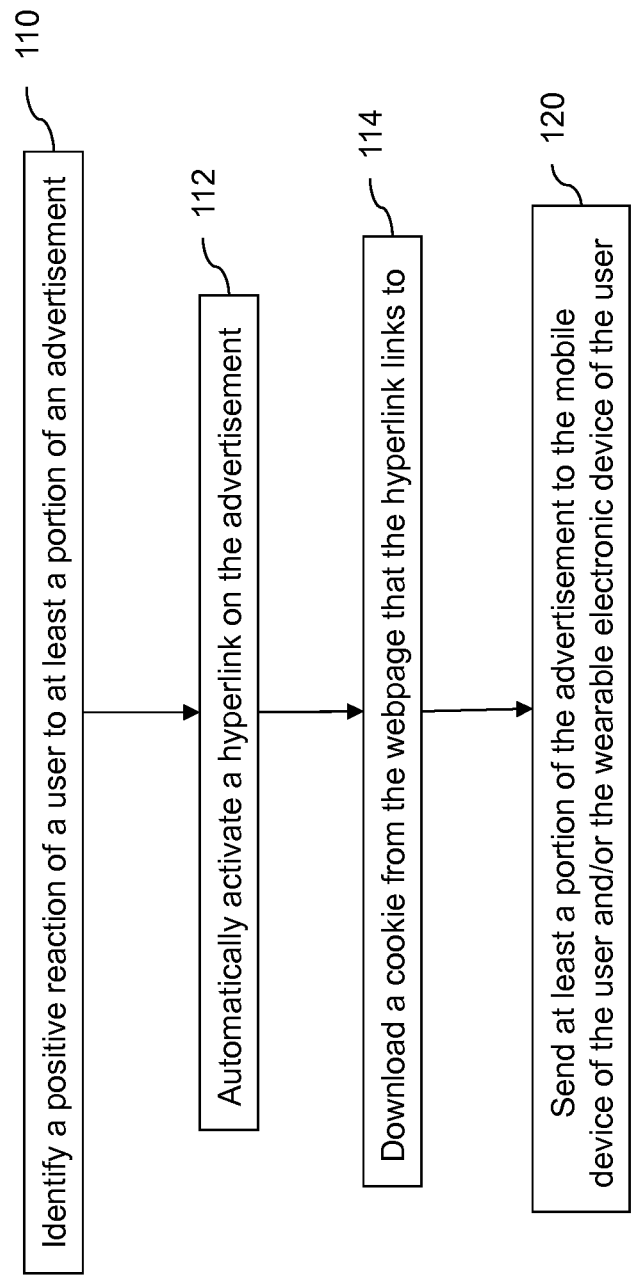
FIG. 1 is a flow diagram illustrating a method for advertising and remarketing according to an embodiment of the invention.

FIG. 1 is a flow diagram illustrating a method for advertising and remarketing according to an embodiment of the invention. A processor identifies a positive reaction of a user to at least a portion of an advertisement 110. As used herein, the term "processor" can include a computer hardware device (e.g., CPU programmed to perform the described functions) positioned in a wearable device of the user, a mobile device of the user, and/or a server. The processor can interact with information regarding or having a predetermined degree of similarity with the advertiser. In at least one embodiment, the identified positive reaction of the user includes viewing of the advertisement for at least a first threshold amount of time (e.g., as detected via electronic glasses or presence on display), activating a hyperlink on the advertisement (e.g., clicking on "Learn More"), making a purchase a second threshold amount of time after the at least a portion of the advertisement was presented to the user (e.g., as identified through the purchasing website, by monitoring the browsing history of the user, and/or by monitoring the user's electronic purchases (e.g., credit card, PayPal)), browsing a website of an advertiser of the advertisement for at least a third threshold amount of time, performing a web search for an item within a first threshold degree of similarity to the advertisement, and/or performing a web search for an entity within a second threshold degree of similarity to the advertiser. For example, the electronic glasses of a user can identify that the user has stared at a print advertisement for Adidas shoes for 14 seconds by scanning the QR code or other unique visual identifier of the advertisement.

As used herein, the term "advertiser" or "advertiser of the advertisement" can include the entity that produces and/or sells the product(s) and/or service(s) that are advertised by the advertisement. In the preceding example, the advertiser is Adidas. As used herein, the term "degree of similarity" can include the degree to which an item is similar to an advertisement, the degree to which an entity is similar to the advertiser, and/or the degree to which a store or website is similar to an advertisement and/or advertiser. For example, running shoes have a high degree of similarity to an advertisement for sports equipment; and, Samsung has a low level of similarity to the advertiser Adidas. The degree of similarity can be determined by the processor and/or the web search engine. In at least one embodiment, the processor queries an electronic database for the item or entity that was searched by the user, wherein the database includes degrees of similarity between items and advertisements, and entities and advertisers. The threshold degrees of similarity can be the same degree of similarity or different degrees of similarity. The threshold amount of times can be the same amount of time or different amount of times.

Figure 5:
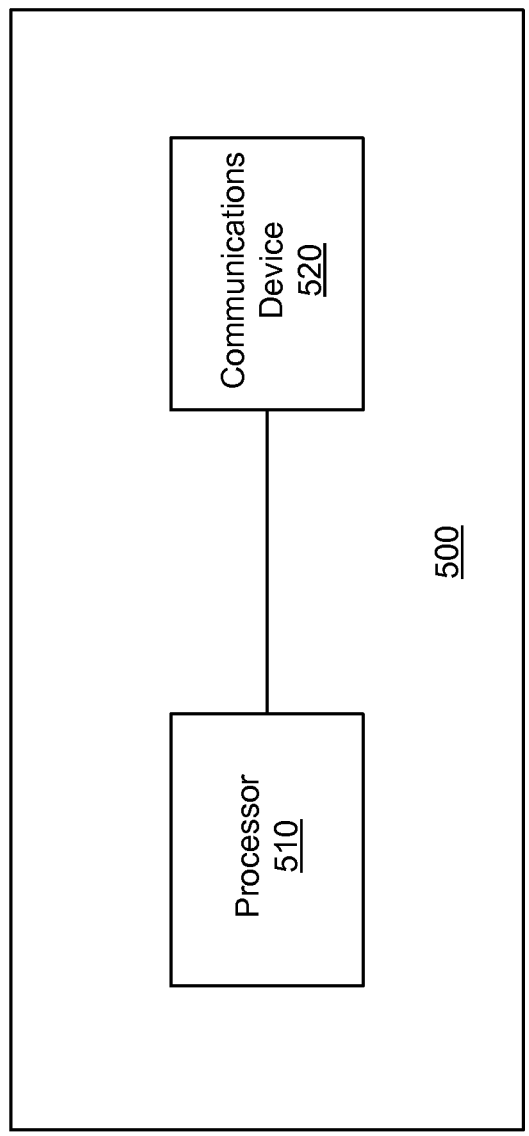
FIG. 5 is a diagram illustrating system hardware for advertising and remarketing according to an embodiment of the invention.

In at least one embodiment of the invention, the processor automatically activates a hyperlink on or connected to the advertisement 112 and downloads a cookie from the webpage that the hyperlink links to 114 when the user views the advertisement for at least the first threshold amount of time. The processor can send at least a portion of the advertisement (an advertisement snippet or the entire advertisement) to the mobile device of the user and/or the wearable electronic device of the user 120. The processor can identify the linkage between the mobile device of the user, the wearable electronic device of the user, and/or the server via the network connections of the mobile device of the user, the wearable electronic device of the user, and/or the server. In another embodiment, such linkage is provided to the processor via input by a user. In another embodiment, a communications device connected to the processor sends the at least a portion of the advertisement (an advertisement snippet or the entire advertisement) to the mobile device of the user and/or the wearable electronic device of the user (i.e., step 120 is performed by a communications device instead of the processor). FIG. 5 illustrates a system 500 including a processor 510 connected to a communications device 520).

In at least one embodiment, the processor sends the at least a portion of the advertisement (i.e., step 120) only when (1) the user is within a first threshold distance to a store of the advertiser, (2) the user is within a second threshold distance to a store that is within a third threshold degree of similarity to the advertisement and/or the advertiser, (3) the user is browsing a website of the advertiser, and/or (4) the user is browsing a website that is within a fourth threshold degree of similarity to the advertisement and/or the advertiser. The threshold distances can be the same distance or different distances.

As used herein, the term "degree of similarity" can include the degree to which a store or website is similar to an advertisement and/or advertiser. For example, a bookstore has a high degree of similarity to Amazon.com and an advertisement for Amazon.com. In another example, WWW.JOESPLUMBING.COM has a low degree of similarity to Amazon.com and an advertisement for Amazon.com.

In at least one embodiment, the processor queries an electronic database for the store or website, wherein the database includes degrees of similarity between stores and advertisements and/or advertisers, and degrees of similarity between websites and advertisements and/or advertisers. For example, the database is queried for "ABC shoe store", which results in degrees of similarity between the ABC shoe store and various advertisements and/or advertisers, wherein the ABC shoe store has a high degree of similarity to retailers and advertisements for shoes, boots, sandals, flip flops, etc.

The at least a portion of the advertisement can be sent to the mobile device of the user only when the at least a portion of the advertisement was not originally presented to the user on the mobile device of the user. Moreover, the at least a portion of the advertisement can be sent to the wearable electronic device of the user only when the at least a portion of the advertisement was not originally presented to the user on the wearable electronic device of the user. Thus, cross-device marketing can be performed by the processor. In at least one embodiment, the processor identifies when at least a portion of the advertisement is presented to the user (the mobile device and the wearable electronic device of the user can notify the processor when at least a portion of the advertisement is presented to the user), and the processor records each instance of presentation in a log. The processor can identify whether at least a portion of the advertisement was originally presented to the user on the mobile device or on the wearable electronic device of the user by identifying the earliest presentation of the at least a portion of the advertisement in the log.

In at least one embodiment, step 120 is omitted and the processor instructs (commands, controls, directs) the mobile device and/or wearable electronic device of the user to present at least a portion of the advertisement to the user only when (1) the user is within the first threshold distance to a store of the advertiser, (2) the user is within the second threshold distance to a store that is within the third threshold degree of similarity to the advertisement and/or the advertiser, (3) the user is browsing a website of the advertiser, and/or (4) the user is browsing a website that is within the fourth threshold degree of similarity to the advertisement and/or the advertiser. As used herein, the term "present" (or "presented" or "presents") can include display (e.g., on an electronic mobile device, television, billboard, print advertisement), play (e.g., on an electronic mobile device, radio, display screen, speakers), and/or sent to a user (e.g., mail, wireless transmission to an electronic device).

At least one embodiment of the invention captures a photograph of a merchandise item (e.g., via wearable electronic device or mobile device) when the user views the merchandise item for at least a fourth threshold amount of time. The photograph can be sent to the mobile device and/or wearable electronic device of the user only when (1) the user is within the first threshold distance to the store of the advertiser, (2) the user is within the second threshold distance to the store that is within the third threshold degree of similarity to the advertisement and/or the advertiser, (3) the user is browsing the website of the advertiser, and/or (4) the user is browsing the website that is within the fourth threshold degree of similarity to the advertisement and/or the advertiser.

In at least one embodiment, an offline advertisement (e.g., similar to the advertisement) is presented to the user only when (1) the user is within the first threshold distance to the store of the advertiser, (2) the user is within the second threshold distance to the store that is within the third threshold degree of similarity to the advertisement and/or the advertiser, (3) the user is browsing the website of the advertiser, and/or (4) the user is browsing the website that is within the fourth threshold degree of similarity to the advertisement and/or the advertiser. The offline advertisement can include a television advertisement, a radio advertisement, and/or a print media advertisement.

The processor can instruct an entity to present the offline advertisement to the user. For example, the processor identifies a positive reaction of a user to an advertisement for ABC Company sunglasses; and, when the processor detects that the user is browsing the website of XYZ Company sunglasses, the processor instructs ABC Company (e.g., via email) to mail a print advertisement to the user. The print advertisement can advertise the same sunglasses or similar sunglasses to the sunglasses in the original advertisement (that received the positive reaction). In another example, the processor instructs XYZ Company to mail a print advertisement to the user when it detects that the user is browsing the website of ABC Company. When the positive reaction of the user to the at least a portion of the advertisement is identified, the processor can download a cookie from the website of the advertiser. The processor can upload the cookie onto the mobile device and/or the wearable electronic device of the user.

Furthermore, the processor can receive context information from the mobile device and/or the wearable electronic device of the user. The context information can include the identity of the user (e.g., legal name, user name, identification number), a list of interests and likes of the user, the past purchase history of the user, the user's location (e.g., city, state, GPS location), the mobile device of the user (e.g., type, model, manufacturer, serial number), the wearable electronic device of the user, an action of the user (e.g., movement data such as walking, loitering, not moving, driving), phone usage state (e.g., on a call, just hung up, phone idle and not in use, phone started to ring), current activities (e.g., watching TV, surfing the Internet, reading a newspaper), past history of actions of the user, and/or the time of the action of the user.

The at least a portion of the advertisement can be selected based on the context information, wherein the selected advertisement can have a threshold degree of similarity to the context information. For example, when the context information includes internet browsing history of flights to Los Angeles, Calif., the selected advertisement includes hotel accommodations and activities in Los Angeles, Calif. In another example, when the context information includes locating the user at a baseball stadium, the selected advertisement is for season ticket plans for the baseball team.

At least one embodiment of the invention provides a system and method to retarget a given customer with repeat of advertisements (also referred to herein as "ads"), aiming for remarketing, that a given potential customer has been exposed to earlier, and has explicitly/implicitly expressed interest in. The system enables cross-device advertising and deals with physical-to-physical, online-to-physical, and physical-to-online advertising and retargeting.

As used herein, the term "advertisement" (also referred to herein as "ad") can include composition of all or some of text, video and audio, television, print media (e.g., newspapers, magazines), and other forms of media or online while browsing the internet, or on any applications on smartphones, tablets or web-enabled wearable devices. As used herein, the terms "retargeting" and "remarketing" can include repeatedly exposing a user to his or her favorite items/services (e.g., enabled by cookie based tracking) so that the user is repeatedly reminded of his or her favorite items/services.

The system can use as input, the history of advertisements shown to the user and the user's reaction (e.g., clicking, purchasing, searching more, staring/gazing at objects in a shop, etc.). In response, the system can output a set of advertisements to be re-served to the user on digital media (e.g., television, streaming services, on demand), physically on web-enabled wearable devices, smartphones, etc.

In at least one embodiment of the invention, a user is initially presented with advertisements (targeted or not) via television, Internet, wearable devices, print media, mobile phones, etc. The user's reaction to the ad is recorded, such as, for example, clicking on the ad, playing the ad video, staring at the ad (which can be detected on the wearable device or detected from a video camera on the monitor), etc. The user, the ad-exchange administrator, or another involved party can input security policies, such as "do not serve ad if the user is driving". The context of user is tracked and if suitable a past favorite ad is re-served on a suitable medium (online or physical) while honoring the security policies. As used herein, the term "context" can include the following information: the user, the user's interests, the user's location, the user's device, the user's action, and the time of the user's action.

The following provides an example of physical-to-physical advertising and retargeting. The following two examples are based on Alice selecting the security policy "do not show ad on mobile device while driving". When Alice is a threshold distance from store ABC, she is served with an ad on her wearable device via push notification, while honoring her security policy. Alice selects the link in the notification and subsequently visits store ABC. This physical world activity is recorded and store ABC is added to Alice's list of favorites. When Alice is a threshold distance from store ABC in the future, she is re-shown the ad if the security policy is satisfied. The ad can be shown on Alice's smartphone, thus, cross device advertising is enabled.

The following provides an example of physical-to-online advertising and retargeting. When Alice is a threshold distance from store ABC, she is served with an ad on her wearable device via push notification, while honoring her security policy. Alice selects the link in the notification and subsequently visits store ABC. This physical world activity is recorded and store ABC is added to Alice's list of favorites. When Alice browses a webpage on her laptop, she is presented with a store ABC ad (e.g., an online offer). In at least one embodiment, the webpage visited by Alice (e.g., www.rawlings.com) is related to the ABC store (e.g., a sports equipment store).

The following provides an example of online-to-physical advertising and retargeting. Alice selects the security policy "do not show ad on mobile device while driving". When Alice browses a webpage, she is presented with a store ABC ad, while honoring her security policy. The webpage visited by Alice (e.g., www.nike.com) can be related to the ABC store (e.g., a shoe store). Alice shows interest and clicks on the ad. In at least one embodiment, this interest is recorded and store ABC is added to Alice's list of favorites, as well as shared via a sharable file or database that can be accessed by applications on her devices. When Alice is a threshold distance from store ABC, she is re-shown the ad if the security policy is satisfied.

In at least one embodiment of the invention, the system transfers cookies and caches across devices as demanded by advertising retargeting requirements using wireless technologies such, for example, as Bluetooth, WiFi, LiFi, or cellular, and downloads cookies by creating invisible click actions (by staring at the advertisements or products long enough) on advertisements from third-party websites. Advertisements/advertisement snippets can be replayed/re-rendered on wearable devices originating from either the same wearable device or from other channels such as media, such as television and the Internet. The system can also scan pictures of locations by wearable devices based upon user intent and with a purpose to reuse for retargeting, and retarget using advertisements generated by personalizing template QR codes.

As used herein, the term "context" can have different implications in different settings. Advertisements can be shown in a certain "context", which can include user context, device context, activity context, network context, time context, environmental context, security context, geo-location context, and/or physiological context. The user context can include the user's profile and/or past history of actions. The device context can include the type of device (e.g., mobile telephone, television, computer, newspaper), device capabilities, and/or rendering slot, i.e., the proper place to render the re-targeting ad (e.g., on the wearable device, instantiated templates, website).

The activity context can include conditions of movement (e.g., walking, loitering, not moving, driving), phone usage state (e.g., on a call, just hung up, phone idle and not in use, phone started to ring), and/or current activities (e.g., watching television, surfing the Internet, reading a newspaper). The network context can include high versus low bandwidth, daily download limit remaining, and/or monthly download limit remaining. The environmental context can include noisy environment or peaceful ambiance. The physiological context can include health conditions and/or known moods.

The system can receive as input an ad set that a potential customer (also referred to herein as the "user") has been exposed to in the past and the volume of exposure (e.g., number of times exposed or total duration). The input can further include the potential customer's reaction to these advertisements, such as actions like clicking on "know more" button when the ad is presented to the device, gazing at the ad when shown on television, Internet, or PAMM-media (e.g., as detected by web-enabled wearables devices such as glasses). Observed, expected, inferred, or learned preferences of the customer to certain sections or snippets of the advertisements is recorded, for example, a particular video shot snippet, a particular image section, music snippet, or line of text. The input into the system can further include the potential customer's action to these advertisements, such as any known purchase or non-purchase behavior (e.g., as found in the potential customer's purchase history) and/or the potential customer's context, given for the current time, or for some time upcoming in the near future. Thus, the reaction of the potential customer to the shown ad is recorded using implicit and explicit methods such as the customer clicking or enlarging a certain part of an image segment of the ad, the customer replaying a given recorded audio that embeds an ad, the customer gazes and repeats gazing to a certain portion of the ad (e.g., detected by a wearable device), and/or the customer's mood as detected by facial expression recognition technology.

The system can output a set of advertisements or a set of advertisement snippets, to be presented to the potential customer, that have been fully or partially presented to the potential customer earlier. The ad or advertisement snippet can be presented on a wearable device of the potential customer, while the customer is in a location and/or situation where it is easy to make a purchase. The ad or advertisement snippet can be presented on the digital media that the potential customer is currently watching, for example, television or Internet. Furthermore, the ad or advertisement snippet can be presented on the PAMM-advertisement or any other template ad instantiation-based advertisement that the potential customer is currently viewing, on print media, in the offline world, or the digital world. Thus, depending upon the context of a given potential customer, his or her past purchase history, the history of the advertisements presented to the customer, and/or the history of the customer liking advertisements or advertisement snippets ("favorites"), advertisements or advertisement snippets are presented to the potential customer such that the action of re-targeting commercially favors the advertiser.

In one exemplary implementation of the system, DLF mall chain has a web application (also referred to herein as "web app" or "app") that can identify context, such as device context, geo-location context, and/or activity context. Swati visits DLF mall in Vasant Kunj, New Delhi, and has the DLF mobile app running on her mobile device. Optics, a store in the DLF mall, sends a location based push notification advertisement on Swati's device, using the identified context. Swati finds the push notification ad interesting, and clicks on the "know more" icon that appears on the ad, taking Swati to the Optics app or website. This action embeds a cookie on Swati's mobile device, containing the entire ad or an advertisement snippet of Optics. As used herein, the term "mobile device" can include cellular telephones, tablet computers, web-enabled glasses, web-enabled watches, etc. The next time Swati is near an Optics store (e.g., as detected via GPS), the Optics ad or advertisement snippet is replayed on her device. Swati's mobile device can also send a push notification or a blue-tooth based information transfer message to Swati's wearable device (e.g., glasses or watch), which renders the ad in an appropriate form. Swati's glasses, for example, can replay the ad or the snippet in its entirety. Swati's watch can play the audio portion of the ad and/or display or project images and/or video of the ad.

In another example, Kuntal is driving a car that is stuck behind a traffic light. Kuntal stares at an ad for Arrow shirts on a bus that has a QR code. Kuntal's glasses identifies that he is staring at the ad for over a threshold amount of time (e.g., 10 seconds) and scans the QR code. The QR code scan encodes a cookie that is implanted on the glasses; and, the ad is scanned and stored, or a reference to the ad is stored. The next time Kuntal is near an Arrow store, the ad is displayed on the glasses. The QR code can be used so that Kuntal can visit the Arrow website and access certain discounts. While sending the web store visit request, such as a HTTP request with JSON parameters), information such as location of the initial ad or advertisement identification number where the QR code had appeared can be embedded, accessible/permissible personalization information and permissible identity information of Kuntal can be embedded, and any other cookie that is permitted to be accessed by the QR code, such as all cookies from Arrow, can be embedded.

In yet another example, Seema, while taking her morning walk, viewed a billboard ad having text and a template QR code for over a threshold amount of time (e.g., 8 seconds). Since the QR code is a template, once Seema's viewing exceeded the threshold, the template QR code is instantiated on her glasses, thereby personalizing the ad for her in terms of text and special offers. The personalized ad is stored in the cache of her glasses so that the next time she is near a point of sale of the advertiser, the personalized (instantiated) ad is replayed on her glasses or other mobile device.

In still yet another example, DLF mall chain has an app that can identify context, such as device context, geo-location context, and activity context. Swati visits DLF mall in Vasant Kunj, New Delhi, and has the DLF app running on her mobile device. Optics, a store in the DLF mall, sends a location based push notification advertisement on Swati's mobile device, using the sensed context. Swati finds the push notification ad interesting, and clicks on the "see more" button that appears on the ad, taking Swati to the Optics app or website. This action embeds a cookie on Swati's mobile device cache, containing the whole ad or an advertisement snippet of Optics, or references to the ad or the advertisement snippet. The next time Swati is front of her laptop, the cookie is transmitted from his mobile device into his laptop over Blue Tooth or NFC; and, Swati is retargeted on her laptop by Optics.

In another example, Kuntal walks into an Adidas store, and takes a close look at a few models of shoes. A context sensing application (e.g., Blue Zen) on Kuntal's glasses identifies that Kuntal is located in an Adidas store. Also, since Adidas is registered with Blue Zen, the website URL of Adidas is known. Kuntal's glasses identifies that he is looking at the shoes for longer than a threshold amount of time (e.g., 15 seconds), so it captures photographs of the shoes and downloads cookies from the Adidas website. The next time Kuntal is near his computer, the glasses transfer the pictures, and optionally the cookies, to the computer. Thus, Kuntal can be retargeted on his computer by Adidas. The retargeting advertisements can include the captured photographs of the shoes that Kuntal had viewed.

In yet another example, Seema stares at a picture ad of XYZ.com appearing on ABC.com for longer than a threshold amount of time (e.g., 5 seconds). Seema's glasses "clicks" on the visible URL of the XYZ.com ad (effectively activates the visible URL of the ad in a background/hidden mode) and downloads a cookie from XYZ.com. In another embodiment, Seema's mobile device tracks her eye movement to identify how long she is viewing the ad. The next time Seema is a threshold distance from a retail center of XYZ.com (e.g., 0.1 miles from an XYZ store), an ad for XYZ.com is replayed on her glasses. The content of the replayed ad can be the same as the content of the original ad or a snippet of the original ad.

In still yet another example, Kuntal browses XYZ.com on his laptop and remains on the website for longer than a threshold amount of time (e.g., 3 minutes). A cookie from XYZ.com is implanted onto Kuntal's laptop, and is transmitted to his glasses (e.g., via Bluetooth or NFC). The next time Kuntal is a threshold distance from a retail center of XYZ.com (e.g., 0.25 miles from an XYZ store), an ad for XYZ.com is replayed on his glasses.

Figure 2:
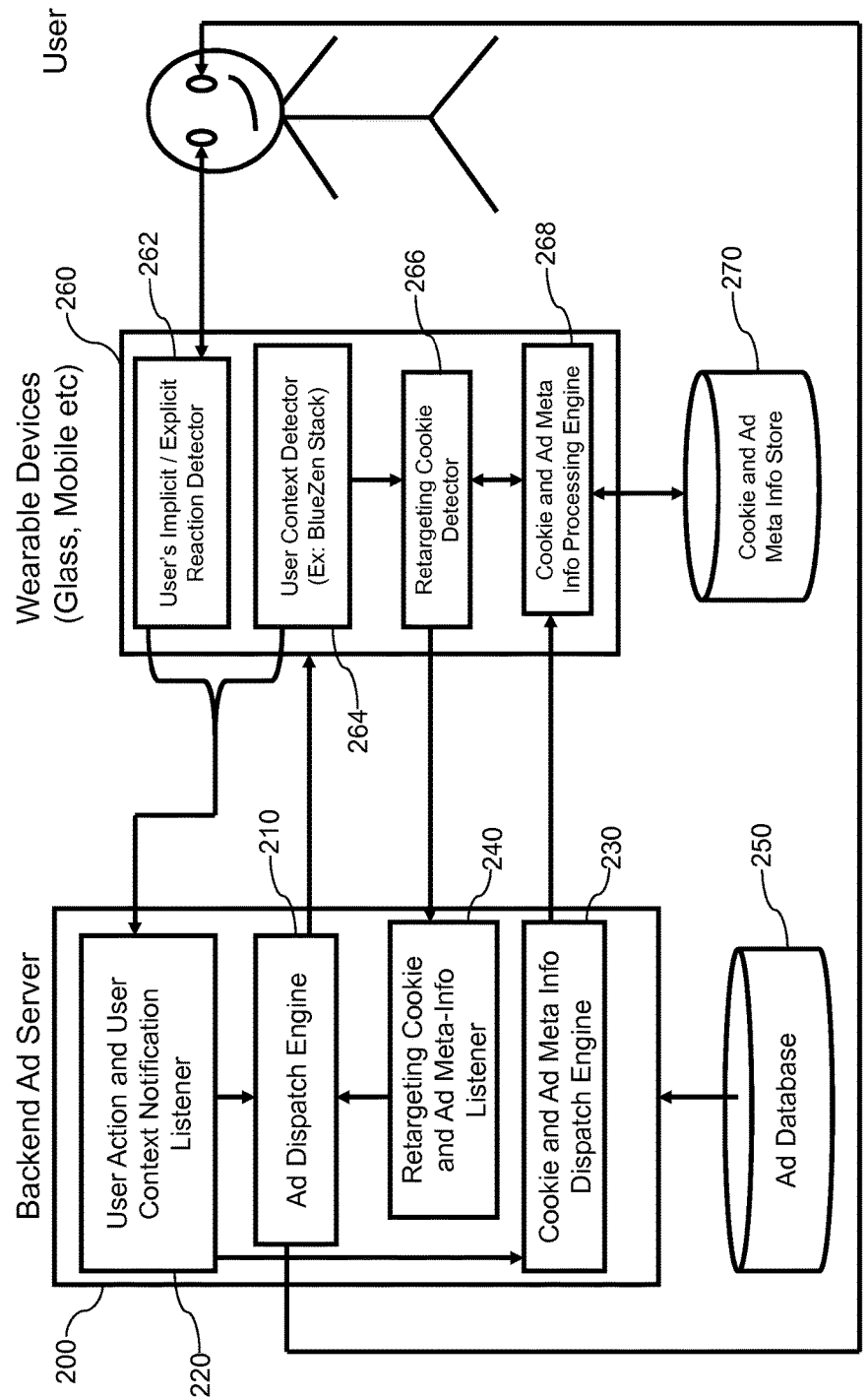
FIG. 2 is an architectural diagram illustrating a physical-to-physical remarketing system according to an embodiment of the invention.

FIG. 2 is an architectural diagram illustrating a physical-to-physical remarketing system according to an embodiment of the invention. A backend ad server 200 can include an ad dispatch engine 210, a user action and user context notification listener 220, a cookie and ad meta info dispatch engine 230, and a retargeting cookie and ad meta info listener 240. As used herein, the term "engine" can include a computer hardware device. The backend ad server 200 can be connected to an ad database 250. As used herein, the term "connected" can include operationally connected, logically connected, in communication with, physically or wirelessly connected, engaged, coupled, contacts, linked, affixed, and attached. In another embodiment, the ad database 250 is included in the backend ad server 200.

The ad dispatch engine 210 can display an ad to a user U and/or the ad can be viewed by a mobile device 260 of the user U (e.g., glasses). The mobile device 260 can include a user's implicit/explicit reaction detector 262, a user context detector 264, a retargeting cookie detector 266, and a cookie and ad meta info processing engine 268. The user U's reaction to the ad can be identified by the user's implicit/explicit reaction detector 262 and sent to the user context notification listener 220. The user context detector 264 can send the user's context (e.g., the user's location and mobile device) to the user context notification listener 220 and the retargeting cookie detector 266. The user context notification listener 220 can send the user's context and/or the user U's reaction to the ad to the ad dispatch engine 210 and/or the cookie and ad meta info dispatch engine 230.

The cookie and ad meta info dispatch engine 230 can send cookies comprising of product and ad viewing information and ad meta info comprising of ad id, ad content, ad view/interest snippet boundaries of the user to the cookie and ad meta info processing engine 268. In at least one embodiment, the cookie and ad meta info processing engine 268 is connected to a cookie and ad meta info store 270, wherein the cookie and ad meta info processing engine 268 receives cookie and ad meta information for timely reuse from the local repository from the cookie and ad meta info store 270, and wherein the cookie and ad meta info store 270 receives the stored cookie and ad meta information when needed to render the retargeted ad to the user from the cookie and ad meta info processing engine 268.

Furthermore, the cookie and ad meta info processing engine 268 can send the existence/non-existence status of retargeting cookies, as well as identifiers of the cookies and ad meta-information (of ads stored in item 270) to the retargeting cookie detector 266, and can receive commands to retrieve the existence/non-existence status of cookies, as well as to retrieve the identifier of the cookies and ad meta-information (of ads stored in item 270) from the retargeting cookie detector 266. The retargeting cookie detector 266 can send the list of identifiers of the cookies and ad meta-information already present in the user's device to the retargeting cookie and ad meta information listener 240; and, the retargeting cookie and ad meta information listener 240 can send (relay) this information to the ad dispatch engine 210.

Figure 3:
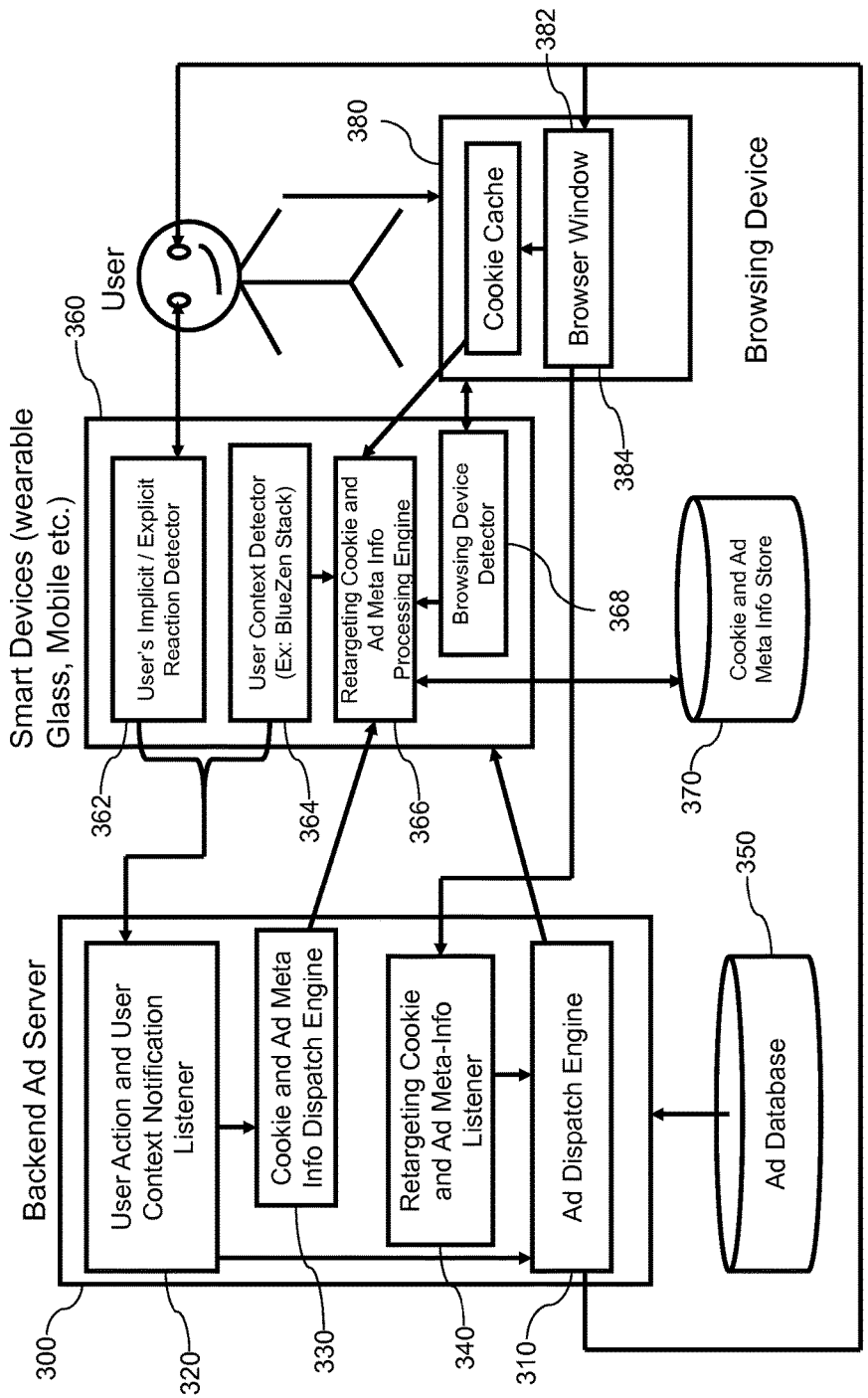
FIG. 3 is an architectural diagram illustrating an online-to-physical remarketing system according to an embodiment of the invention.

FIG. 3 is an architectural diagram illustrating an online-to-physical remarketing system according to an embodiment of the invention. A backend ad server 300 can include an ad dispatch engine 310, a user action and user context notification listener 320, a cookie and ad meta information dispatch engine 330, and a retargeting cookie and ad meta information listener 340. The backend ad server 300 can be connected to an ad database 350.

The ad dispatch engine 310 can display an ad to a user U, and send the ad to a browsing device 380 of the user U (e.g., cellular phone). The browsing device 380 (also referred to herein as a "mobile device") can include a cookie cache 382 and a browser window 384. The wearable device 360 (also referred to herein as the "smart device") can include a user's implicit/explicit reaction detector 362, a user context detector 364, a retargeting cookie and ad meta information processing engine 366, and a browsing device detector 368. The wearable device 360 (or the retargeting cookie and ad meta information processing engine 366) can be connected to a cookie and ad meta information store 370, wherein cookie and ad meta information for timely reuse from the local repository is received from the cookie and ad meta information store 370, and wherein the cookie and ad meta information for timely reuse from the local repository is sent to the cookie and ad meta information store 370.

The user U's reaction to the ad can be identified by the user's implicit/explicit reaction detector 362 and sent to the user context notification listener 320. The user context detector 364 can send the user's context (e.g., the user's location) to the user context notification listener 320 and the retargeting cookie and ad meta information processing engine 366. The user context notification listener 320 can send the user's context and/or the user U's reaction to the ad to the cookie and ad meta information dispatch engine 330.

The cookie and ad meta information dispatch engine 330 can send cookies having product and ad viewing information and ad meta information comprising of ad ID, ad content, ad view/interest snippet boundaries of the user to the retargeting cookie and ad meta information processing engine 366. The retargeting cookie and ad meta information processing engine 366 can receive cookies and ad meta information from the cookie cache 382; and, the cookie cache 382 can receive cookies and ad meta information from the browser window 384.

The browsing device 380 can send identification signals/acknowledgements such as Bluetooth pings, NFC pings and other data exchange protocol pings to the browsing device detector 368, and receive identification signals/acknowledgements from the browsing device detector 368. The browsing device detector 368 can send a signal to "accept cookies and ad meta-information from the cookie cache 382 inside browsing device 380" to the retargeting cookie and ad meta information processing engine 366. The browser window 384 can send cookies and ad meta-information and user's reaction (such as focus on the ads, invisible clicks, etc.) to the retargeting cookie and ad meta information listener 340; and, the retargeting cookie and ad meta information listener 340 can send retargeting ads that are ready for rendering to the ad dispatch engine 310.

Figure 4:
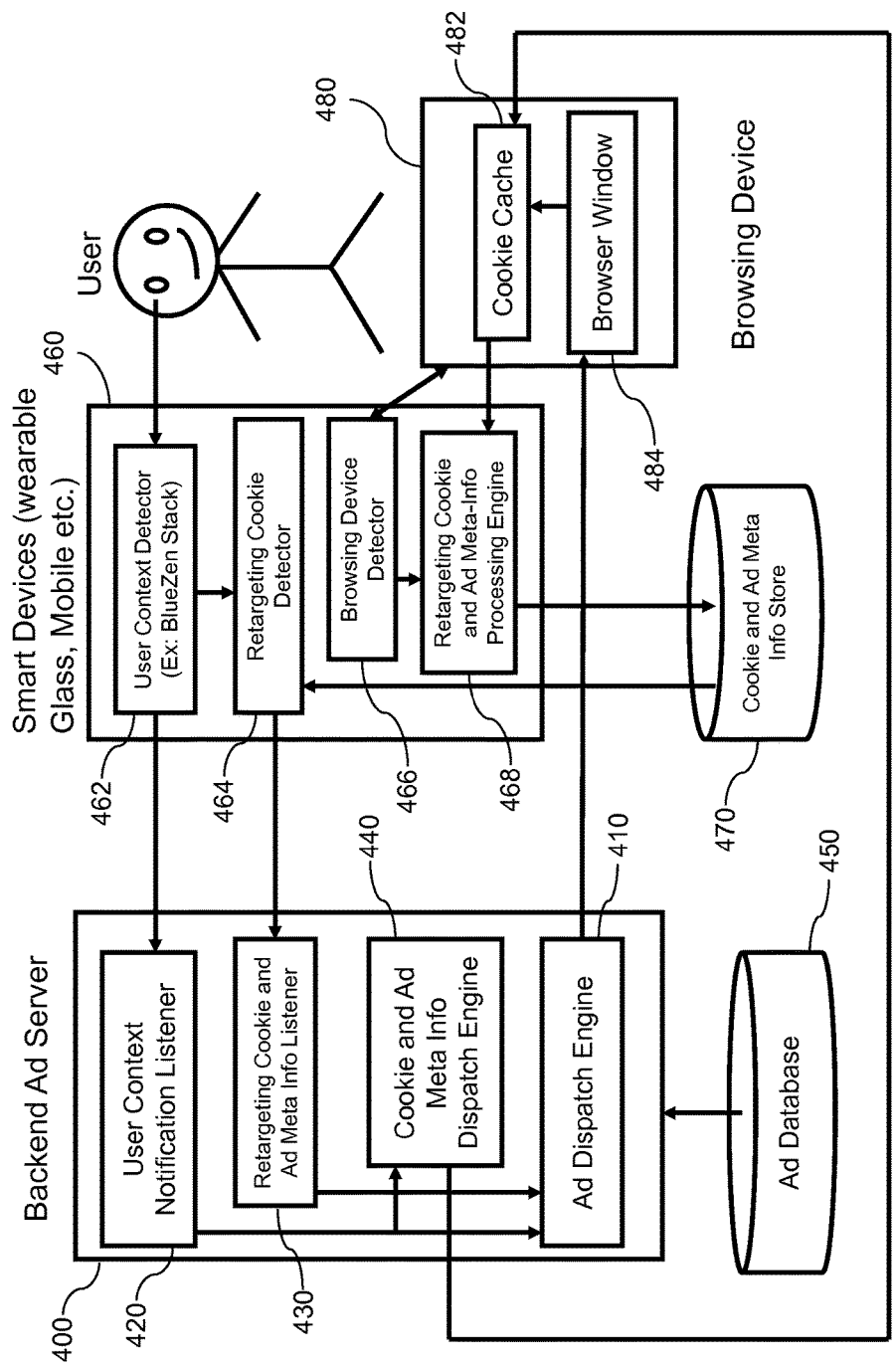
FIG. 4 is an architectural diagram illustrating a physical-to-online remarketing system according to an embodiment of the invention.

FIG. 4 is an architectural diagram illustrating a physical-to-online remarketing system according to an embodiment of the invention. A backend ad server 400 can include an ad dispatch engine 410, a user context notification listener 420, a retargeting cookie and ad meta information processing listener 430, and a cookie and ad meta information dispatch engine 440. The backend ad server 400 can be connected to and receive advertisements from an ad database 450.

The ad dispatch engine 410 can send an ad to a browsing device 480 of a user U (e.g., cellular phone). The browsing device 480 can include a cookie cache 482 and a browser window 484. A wearable device 460 (also referred to herein as a "smart device", which may be wearable) of the user U can include a user context detector 462, a retargeting cookie detector 464, a browsing device detector 466, and a retargeting cookie and ad meta information processing engine 468. In at least one embodiment, the wearable device 460 is connected to a cookie and ad meta information store 470, wherein the retargeting cookie detector 464 receives already-existing retargeting cookies that were stored on the user's device in previous visits to the physical premise and the corresponding ad meta-information from the cookie and ad meta information store 470, and wherein the retargeting cookie and ad meta information processing engine 468 sends cookie and ad meta-information to the cookie and ad meta information store 470.

The user U's reaction to the ad can be identified by the user context detector 462. The user context detector 462 can send the user U's reaction to the ad and the user's context (e.g., the user's location) to the user context notification listener 420 and/or the retargeting cookie detector 464. The user context notification listener 420 can send the user's context and/or the user U's reaction to the ad dispatch engine 410. The retargeting cookie detector 464 can send the list of identifiers of the cookies and ad meta-information already present in the user's device to the retargeting cookie and ad meta-information listener 430; and, the retargeting cookie and ad meta-information listener 430 can send (relay) this information to the ad dispatch engine 410.

The cookie and ad meta information dispatch engine 440 can send retargeting cookies and ad meta-information to the cookie cache 482. The ad dispatch engine 410 can send the ad to the browser window 484; and the browser window 484 can send the ad to the cookie cache 482. The cookie cache 482 can send the ad to the retargeting cookie and ad meta information processing engine 468. The browsing device 480 can send identification signals/acknowledgements such as Bluetooth pings, NFC pings and other data exchange protocol pings to the browsing device detector 466; and, the browsing device detector 466 can send identification signals/acknowledgements to the browsing device 480. The browsing device detector 466 can send a signal to accept cookies and ad meta-information from the cookie cache inside browsing device to the retargeting cookie and ad meta information listener 468.

In at least one embodiment of the invention, a wearable device (e.g., glasses) makes an "invisible click" on an icon of a webpage to be directed to a URL of a retail store and downloads the cookie of the retail store. For example, using Blue Zen and detecting that Kuntal is in Adidas store (as described in the example above), the URL is provided by the advertiser as a custom variable associated with the Adidas store and registered with Blue Zen.

The system can transfer cookies from a mobile device to a wearable device and/or a laptop or desktop computer, and vice versa, using a listener and a pushing subsystem at both the mobile device and the wearable device. The system can also transfer files containing audio, text, images, advertisement snippets, and/or whole advertisements, or references to any of the above, across computers, laptops, mobile devices, and wearable devices. Moreover, the system can instantiate, personalize, and store (e.g., in cache) template QR codes on wearable devices while scanning a QR code, as well as while replaying an ad generated from a QR code under given context (early or late instantiation).

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
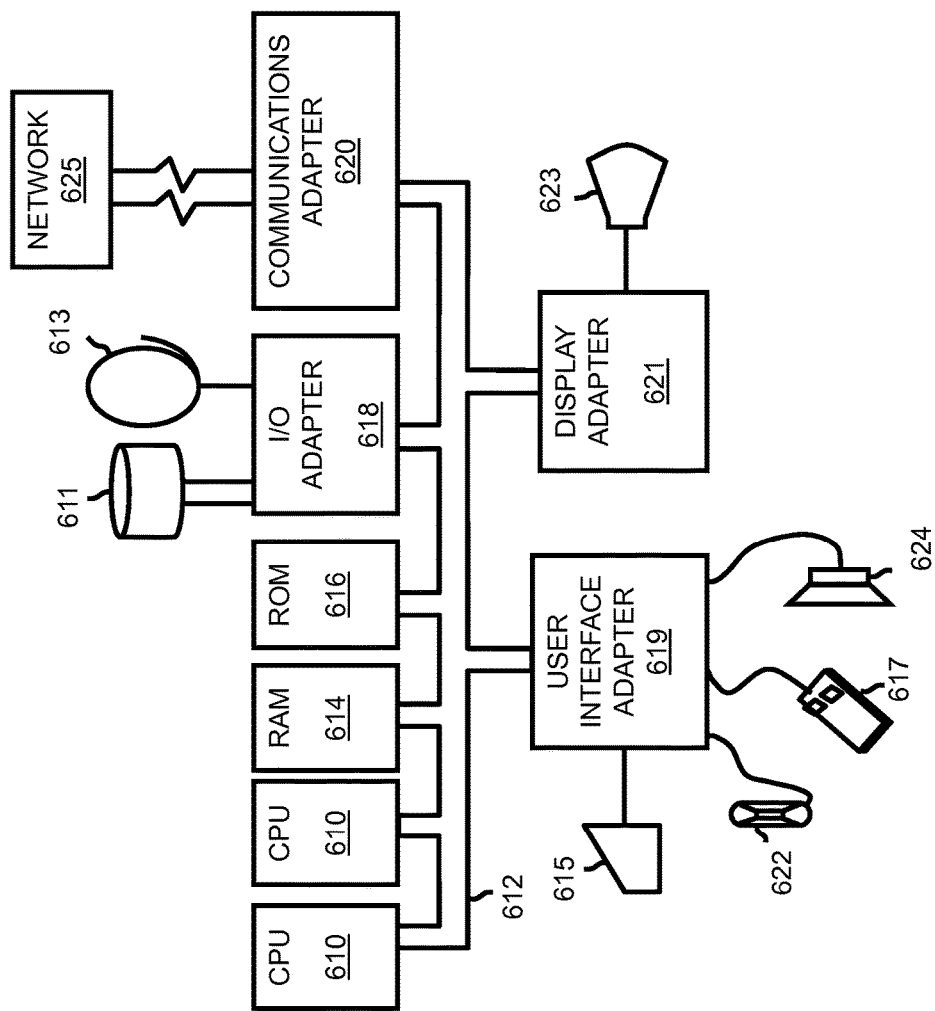
FIG. 6 is a diagram illustrating a computer program product for advertising and remarketing according to an embodiment of the invention.

Referring now to FIG. 6, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 610. The CPUs 610 are interconnected with system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of at least one embodiment of the invention. The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations'.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
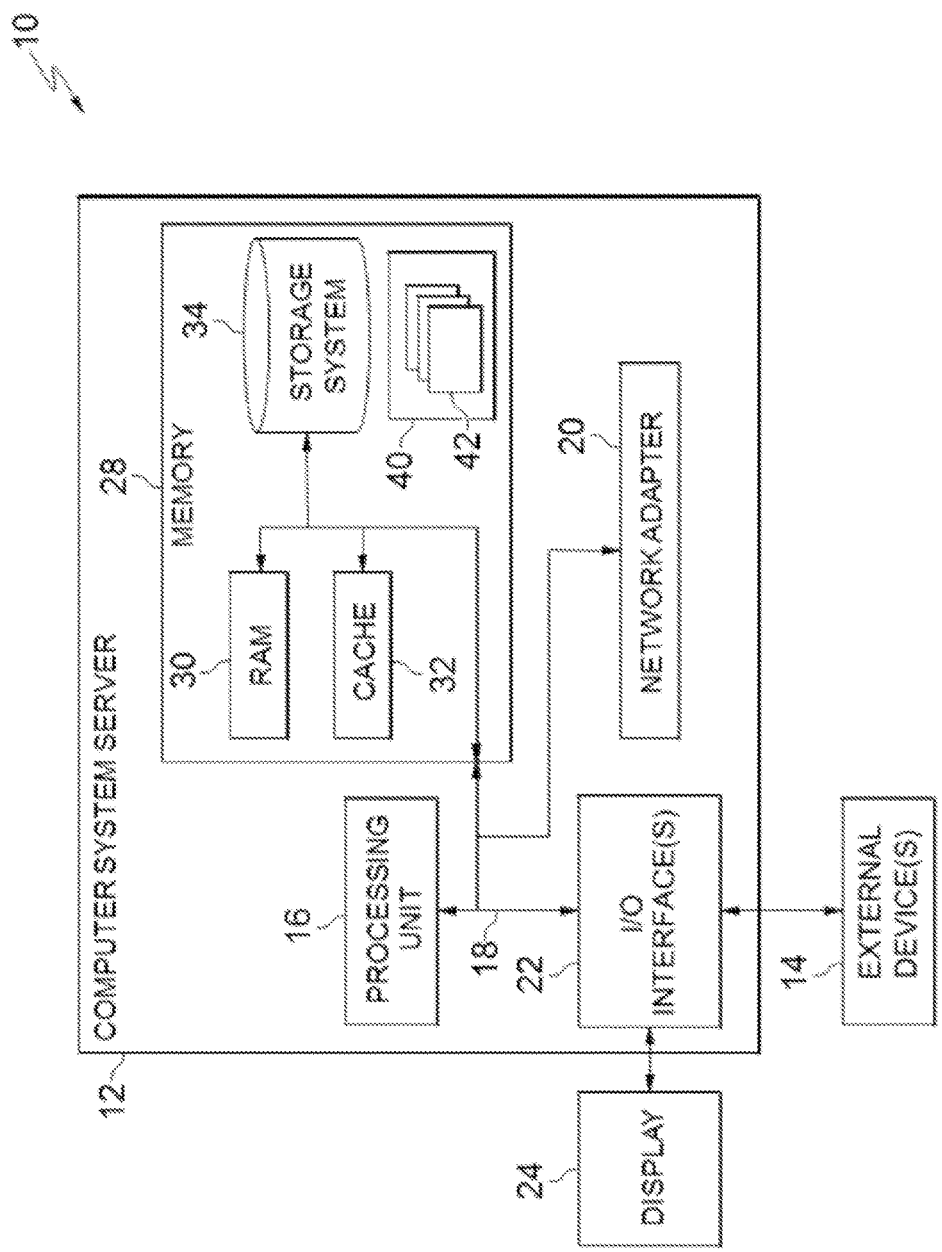
FIG. 7 depicts a cloud computing node according to an embodiment of the present invention.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
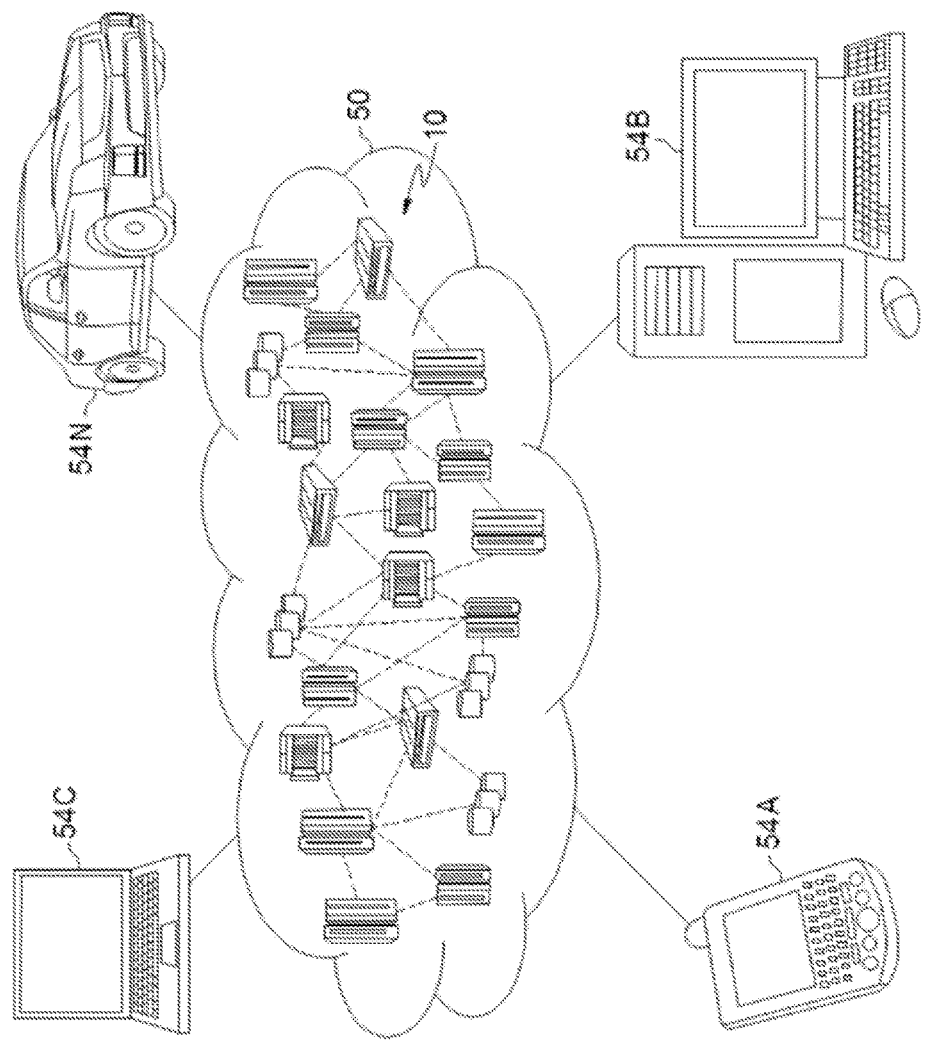
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
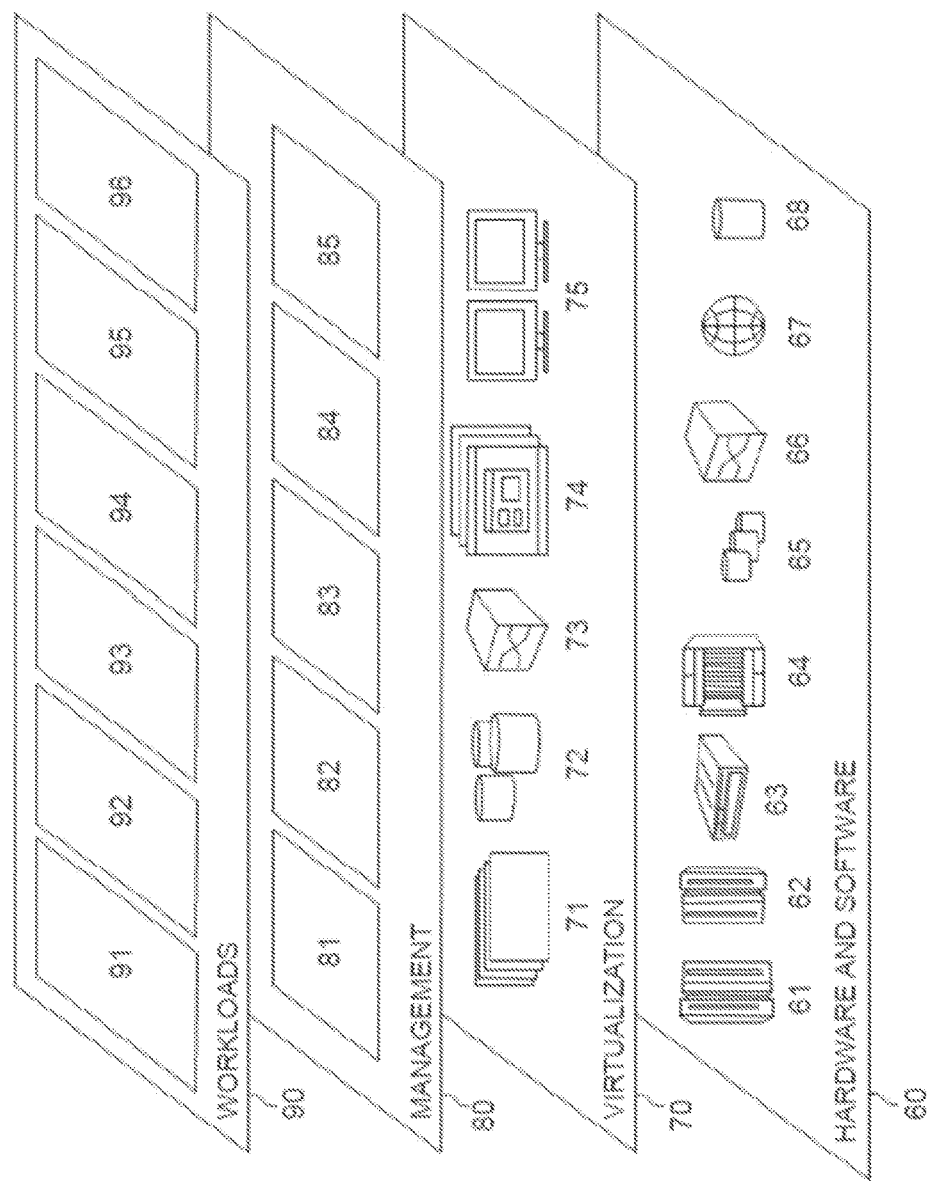
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cross-device and cross-channel advertising and remarketing 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for advertising, said method comprising:
identifying, via processing circuitry of a wearable device, a positive reaction of a user to at least a portion of an advertisement, the positive reaction including:
   viewing the advertisement for at least a first threshold amount of time,
   making a purchase a second threshold amount of time after the at least a portion of the advertisement was presented to the user,
   browsing a website of an advertiser of the advertisement for at least a third threshold amount of time,
   performing a web search for an item based on a similarity to the advertisement, and
   performing a web search for an entity based on a similarity to the advertiser; and
identifying, via processing circuitry of a mobile device, a linkage between the mobile device and one or more other devices including the wearable electronic device:
automatically activating, at the mobile device, a hyperlink on the advertisement and downloading a cookie from a webpage that the hyperlink links to when the user views the advertisement for at least the first threshold amount of time:
sending the cookie to the one or more other devices based on the identified linkage:
sending, based on the identified linkage and the positive reaction, an instruction to the mobile device of the user and the wearable electronic device of the user when:
   the user is within a first threshold distance to a store of the advertiser,
   the user is within a second threshold distance to a store having a similarity to the advertisement,
   the user is within the second threshold distance to a store having a similarity to the advertiser,
   the user is browsing a website of the advertiser,
   the user is browsing a website having a similarity to the advertisement, and
   the user is browsing a website having a similarity to the advertiser,
the instruction including an instruction to present based on the cookie the at least a portion of the advertisement to the user.

2. The method according to claim 1, further comprising:
capturing a photograph of a merchandise item with the wearable electronic device of the user and the mobile device of the user when the user views the merchandise item for at least a fourth threshold amount of time; and
sending the photograph to the mobile device of the user and the wearable electronic device of the user when: the user is within the first threshold distance to the store of the advertiser, the user is within the second threshold distance to the store that is within the third threshold degree of similarity to at least one of the advertisement and the advertiser, the user is browsing the website of the advertiser, and the user is browsing the website that is within the fourth threshold degree of similarity to at least one of the advertisement and the advertiser.

3. The method according to claim 1, wherein said sending of the at least a portion of the advertisement includes sending the at least a portion of the advertisement to the mobile device of the user when the at least a portion of the advertisement was not originally presented to the user on the mobile device of the user.

4. The method according to claim 1, wherein said sending of the at least a portion of the advertisement includes sending the at least a portion of the advertisement to the wearable electronic device of the user when the at least a portion of the advertisement was not originally presented to the user on the wearable electronic device of the user.

5. The method according to claim 1, further comprising:
presenting an offline advertisement to the user when:
   the user is within the first threshold distance to the store of the advertiser, the user is within the second threshold distance to the store that is within the third threshold degree of similarity to at least one of the advertisement and the advertiser, the user is browsing the website of the advertiser, and the user is browsing the website that is within the fourth threshold degree of similarity to at least one of the advertisement and the advertiser, the offline advertisement including at least one of a television advertisement, a radio advertisement, and a print media advertisement.

6. The method according to claim 1, further comprising:
receiving context information from the mobile device of the user and the wearable electronic device of the user, the context information including: an identity of the user, a list of interests and likes of the user, past purchase history of the user, the user's location, the mobile device of the user, the wearable electronic device of the user, an action of the user, phone usage state, current activities, past history of actions of the user, and a time of the action of the user.

7. The method according to claim 6, further comprising:
selecting the at least a portion of the advertisement based on the context information.

8. A method for advertising, said method comprising:
identifying, via processing circuitry of a wearable device, a positive reaction of a user to at least a portion of an advertisement, the positive reaction including at least one of:
   viewing the advertisement for at least a first threshold amount of time,
   making a purchase a second threshold amount of time after the at least a portion of the advertisement was presented to the user,
   browsing a website of an advertiser of the advertisement for at least a third threshold amount of time,
   performing a web search for an item based on a similarity to the advertisement, and
   performing a web search for an entity based on a similarity to the advertiser; and
identifying, via processing circuitry of a mobile device, a linkage between the mobile device and one or more other devices including the wearable electronic device;
automatically activating, at the mobile device, a hyperlink on the advertisement and downloading a cookie from a webpage that the hyperlink links to when the user views the advertisement for at least the first threshold amount of time;

sending the cookie to the one or more other devices based on the identified linkage;

sending, based on the identified linkage and the positive reaction, at least a portion of the advertisement based on the cookie to at least one of the mobile device of the user and the wearable electronic device of the user when at least one of:
- the user is within a first threshold distance to a store of the advertiser,
- the user is within a second threshold distance to a store having a similarity to at least one of the advertisement and the advertiser,
- the user is browsing a website of the advertiser, and
- the user is browsing a website having a similarity to at least one of the advertisement and the advertiser.

9. The method according to claim 8, further comprising:
capturing a photograph of a merchandise item with at least one of the wearable electronic device of the user and the mobile device of the user when the user views the merchandise item for at least a fourth threshold amount of time; and sending the photograph to at least one of the mobile device of the user and the wearable electronic device of the user when at least one of:
the user is within the first threshold distance to the store of the advertiser, the user is within the second threshold distance to the store that is within the third threshold degree of similarity to at least one of the advertisement and the advertiser, the user is browsing the website of the advertiser, and the user is browsing the website that is within the fourth threshold degree of similarity to at least one of the advertisement and the advertiser.

10. The method according to claim 8, wherein said sending of the at least a portion of the advertisement includes sending the at least a portion of the advertisement to the mobile device of the user when the at least a portion of the advertisement was not originally presented to the user on the mobile device of the user.

11. The method according to claim 8, wherein said sending of the at least a portion of the advertisement includes sending the at least a portion of the advertisement to the wearable electronic device of the user when the at least a portion of the advertisement was not originally presented to the user on the wearable electronic device of the user.

12. The method according to claim 8, further comprising:
presenting an offline advertisement to the user when at least one of: the user is within the first threshold distance to the store of the advertiser, the user is within the second threshold distance to the store that is within the third threshold degree of similarity to at least one of the advertisement and the advertiser, the user is browsing the website of the advertiser, and the user is browsing the website that is within the fourth threshold degree of similarity to at least one of the advertisement and the advertiser, the offline advertisement including at least one of a television advertisement, a radio advertisement, and a print media advertisement.

13. The method according to claim 8, further comprising:
receiving context information from at least one of the mobile device of the user and the wearable electronic device of the user, the context information including at least one of: an identity of the user, a list of interests and likes of the user, past purchase history of the user, the user's location, the mobile device of the user, the wearable electronic device of the user, an action of the user, phone usage state, current activities, past history of actions of the user, and a time of the action of the user.

14. The method according to claim 13, further comprising:
selecting the at least a portion of the advertisement based on the context information.

15. A non-transitory computer-readable medium having computer-readable instructions stored thereon which when executed by one or more computing devices cause the one or more computing devices to perform a method comprising:
identifying, at a wearable device, a positive reaction of a user to at least a portion of an advertisement, the positive reaction including at least one of:
viewing the advertisement for at least a first threshold amount of time,
making a purchase a second threshold amount of time after the at least a portion of the advertisement was presented to the user,
browsing a website of an advertiser of the advertisement for at least a third threshold amount of time,
performing a web search for an item based on a similarity to the advertisement, and
performing a web search for an entity based on a similarity to the advertiser; and identifying, at a mobile device, a linkage between the mobile device and one or more other devices including the wearable electronic device;

automatically activating, at the mobile device, a hyperlink on the advertisement and downloading a cookie from a webpage that the hyperlink links to when the user views the advertisement for at least the first threshold amount of time;

sending the cookie to the one or more other devices based on the identified linkage;

sending, based on the identified linkage and the positive reaction, at least a portion of the advertisement based on the cookie to at least one of the mobile device of the user and the wearable electronic device of the user when at least one of:
the user is within a first threshold distance to a store of the advertiser,
the user is within a second threshold distance to a store having a similarity to at least one of the advertisement and the advertiser,
the user is browsing a website of the advertiser, and
the user is browsing a website having a similarity to at least one of the advertisement and the advertiser.

* * * * *